United States Patent [19]

Renschke

[11] 4,266,213
[45] May 5, 1981

[54] CIRCUIT ARRANGEMENT FOR AN INPUT KEYBOARD

[75] Inventor: Joachim Renschke, Teningen, Fed. Rep. of Germany

[73] Assignee: ITT Industries, Inc., New York, N.Y.

[21] Appl. No.: 102,214

[22] Filed: Dec. 10, 1979

[51] Int. Cl.³ .............................................. H04Q 3/52
[52] U.S. Cl. ........................... 340/166 R; 340/365 R
[58] Field of Search ............... 340/166 R, 345, 365 R, 340/365 S

[56] References Cited

U.S. PATENT DOCUMENTS 3,708,626 1/1973 Lutz .................................. 340/166 R
3,940,571 2/1976 Ashley ............................. 340/166 R
4,060,699 11/1977 Ataka et al. ...................... 340/166 R Primary Examiner—Alvin H. Waring
Attorney, Agent, or Firm—John T. O'Halloran; Peter C. Van Der Sluys

[57] ABSTRACT

The invention provides an electronic circuit, preferably in CMOS, for a keyboard switch matrix with only two pole switches and no interconnecting diodes. The column and row wires are each connected to ground via a resistor and to the supply voltage via an electronic switch and an inverter. The output of the row inverters are connected to a NAND gate which controls the electronic switches.

2 Claims, 3 Drawing Figures

CIRCUIT ARRANGEMENT FOR AN INPUT KEYBOARD

BACKGROUND OF THE INVENTION

1. Field of the Invention

The present invention relates to input keyboards and, more particularly, to keyboards having a matrix without interconnecting diodes.

2. Description of the Prior Art

Electronic equipment is controlled in a great many cases via an input keyboard which, as a rule, consists of push-button switches arranged in rows and columns. Such electronic equipment may include, for example, electronic computers, electronic pocket calculators, or remote control units for e.g. phono equipment, radio or television receivers. The pushbutton switches, while being actuated, serve to establish electrical connections between input leads which may be associated with the aforementioned rows and columns. Thus, in the "IBM Technical Disclosure Bulletin", October 1966, on pages 532/33 there is described a keyboard circuit for data-processing systems in which the information is offered via the just depressed pushbutton switch in a three-out-of-eight code. The pushbutton switches as such, are simple two-pole switches acting as operating contacts. Each pushbutton switch is associated with four decoupling diodes connecting it with four of nine input leads of the data-processing system which, in turn, continuously interrogates the input keyboard with the aid of sampling signals, thus detecting a depressed pushbutton switch. Accordingly, this is a dynamically operating arrangement.

On page 36 of the technical journal "Electronic Engineering" for September 1976, there is described another data-processing system whose input keyboard cooperates with the integrated circuit of the type MC 14419 which is described in greater detail on pages 5/201 to 5/204 of the data book published by the firm of Motorola "Semiconductor Data Library", Vol. 5, Series B, 1976. From FIG. 4 as shown therein, it is to be seen that the pushbutton switches must be either equipped with double contacts because they, when actuated, apply a supply voltage to the respective column or row lead, or that a pushbutton switch with a single contact may be provided for when being connected to the respective column or row lead via two diodes. It is obvious that such a design or such a wiring of the pushbutton switches is more expensive than the pushbutton switches employing a single contact proposed for use by the aforementioned passage of literature. The aforementioned integrated circuit of the type MC 14419 contains a two-out-of-eight encoder with a subsequently arranged code converter for obtaining a binary-coded decimal (BCD). This circuit likewise operates dynamically, i.e. there is provided a clock oscillator for controlling the code-forming sequence.

From a further data sheet published by the firm of Motorola Semiconductors, No. E 175, June 1976, it is known to use the integrated circuit of the type MC 14422 P as realized in accordance with the known CMOS-technique, with remote control transmitters, which likewise operates dynamically and, for this purpose contains a sampling oscillator, a sampling control circuit and further additional circuits. In this arrangement, it is likewise possible to use single-pole pushbutton switches. Finally, from the technical journal "Electronics", of Jan. 6, 1977, pp. 110 to 112 there is known an input keyboard employing simple pushbutton switches in which the respective depressed key is ascertained with the aid of the microprocessor F8, for which the corresponding program (software) is disclosed in the publication.

Accordingly, the two last-mentioned publications show arrangements solving the keyboard coding problem with an investment which is relatively high also with respect to integrated circuits. In particular, the last-mentioned publication including the proposal of using for this purpose a commercially available type of microprocessor, is not realizable in cases where, for example with the aforementioned remote control units, the keyboard coding as well as the remaining remote control transmitter circuit is to be accommodated in one single integrated circuit. In such a case, the keyboard coding arrangement must do with as little as possible crystal surface in order to leave enough crystal surface of the integrated circuit for being utilized for the actual functioning of the remote control transmitter. When looked at from this point of view, it would appear to be entirely mistaken to provide a microprocessor, because substantial parts thereof would remain unused. But also the aforementioned dynamic technique is too expensive for meeting the given requirement.

SUMMARY OF THE INVENTION

It is an object of the invention to provide a circuit arrangement for input keyboards in which it is possible to use pushbutton switches with two terminals and without having to take any additional decoupling measures and which, for the purpose of reducing the crystal surface necessary for the integration, only requires a small number of electronic components per pushbutton switch or per row and column respectively. When at normal, the circuit arrangement is supposed to operate statically, i.e. to operate dynamically only upon depression of a pushbutton switch, so that e.g. in battery-operated devices (remote control transmitters, etc) the battery is saved as much as possible.

DESCRIPTION OF THE INVENTION

Figure 1:
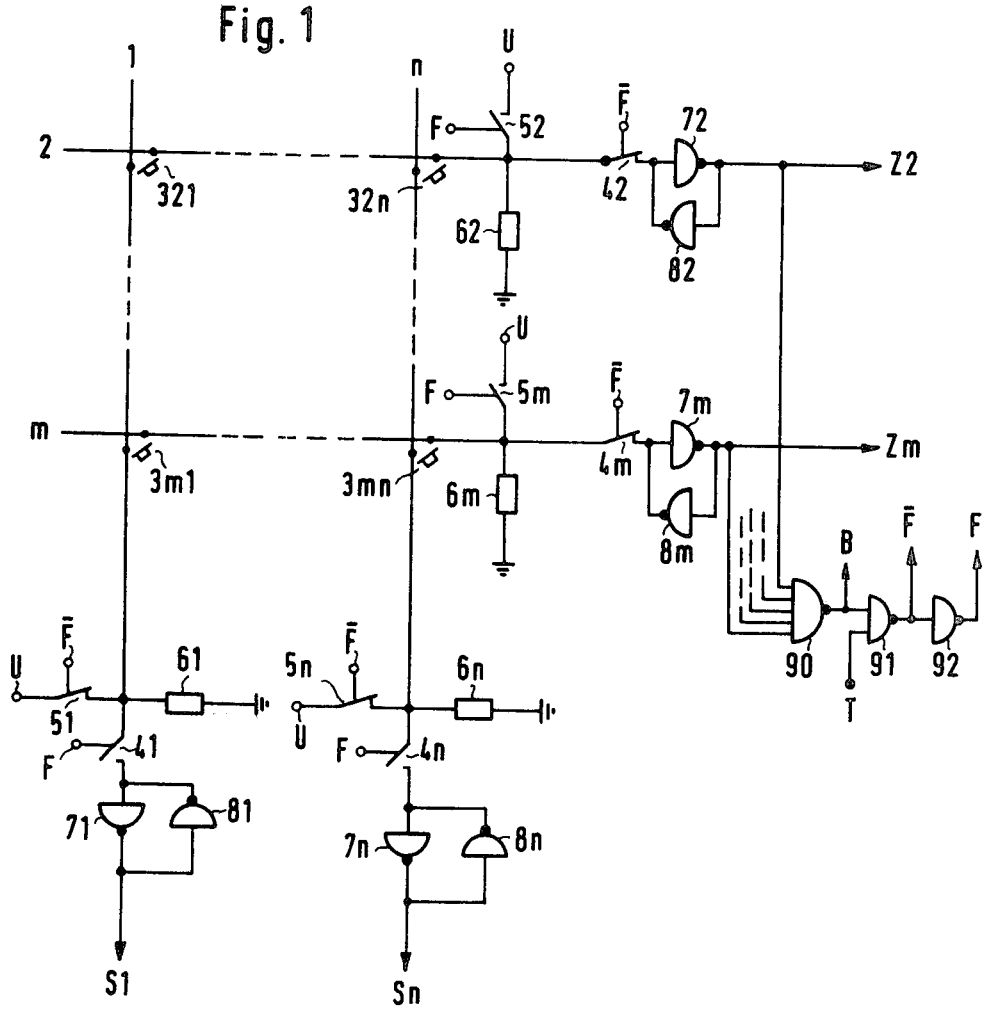
FIG. 1 is a schematic circuit diagram of one embodiment of the invention.

For the sake of simplicity merely the column leads 1 and n as well as the row leads 2 and m are shown of the possible n column leads and the m possible row leads of an m·n keyboard switch matrix arrangement, in the schematical diagram of FIG. 1. The pushbutton switches are arranged at the respective crosspoints of the row and column leads of the matrix, which each establish a direct galvanical connection when depressed. In FIG. 1, the pushbutton 321 is shown to be arranged at the crosspoint of the column 1 with the row 2, as well as the pushbutton switches 32n, 3m1 and 3mn.

The column leads 1 . . . n and the row leads 2 . . . m are each applied across a resistor to the zero point of the circuit; accordingly, FIG. 1 shows the column resistors 61, 6n as well as the row resistors 62, 6m. Each column lead 1 . . . n is applied via the first electronic column switch 41 ... 4n to the input of the column inverter 71 ... 7n and via the second electronic column switch 51 ... 5n to the supply voltage U. In an analogous way, each row lead 2 ... m is applied via the first row switch 42 ... 4m to the input of the row inverter 72 ... 7m and via the second electronic row switch 52 ... 5m, to the supply voltage U. The hold inverter 81 ... 8n; 82 ... 8m which is dimensioned highly resistive, is respectively arranged in an anti-parallel connection with respect to both the column and the row inverters 71 ... 7n; 72 ... 7m.

The outputs of the row inverters 72 ... 7m are connected to each time one input of the first NAND gate 90 having m inputs, and from the output of which there may be taken a signal which is hereinafter referred to as the actuating signal B. This signal always appears when one of the pushbutton switches is depressed. Moreover, the output signal of the first NAND gate 90 is applied to one input of the second NAND gate 91, to the other input of which there is applied a rectangular clock signal T. The output signal F̄ of the second NAND gate 91 is applied to the control inputs of the first row switches 42 ... 4m and of the second column switches 51 ... 5n, and is moreover applied to the input of the inverter 92 whose output signal F is applied to the control inputs of the first column switches 41 ... 4n and of the second row switches 52 ... 5m.

Figure 2:
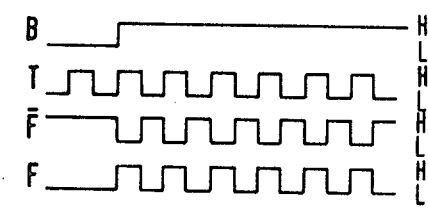
FIG. 2 shows various signal waveforms as appearing in FIG. 1.

In FIG. 1 the row and column switches are shown to be in such a position as corresponds to non-depressed push-button switches; the signal waveform as shown in FIG. 2 on the left of the vertical arrow, corresponds to this. Accordingly, the output signal F̄ has an H-level, and the output signal F has an L-level. (The H-level is the more positive one, and the L-level is the more negative one of two binary levels). Thus, all row outputs Z2 ... Zm are likewise at H-potential, while all column outputs S1 ... Sn show to have that particular switch state which existed prior to the opening of the first column switch 41 ... 4n. This state is maintained by the hold inverters 81 ... 8n which are dimensioned highly resistive. When a new binary signal state appears at the output of the associated row or column inverter, the highly resistive hold inverter, however, will not affect the inversion. Accordingly, in the non-operative state of the pushbutton switches, an L-level will exist at the output of the first NAND gate 90 with this L-level, in connection with the second NAND gate 91, preventing the clock signal T from reaching the output thereof. Accordingly, the signal F̄ as appearing at the output of the second NAND gate 91 assumes an H-state, and the signal F as appearing at the output of the inverter 92 assumes an L-state, and in this way the states of both the first and the second column and row switches are exactly defined.

The aforementioned actuating signal B may be used, for example, for triggering an oscillator generating the clock signal T, so that this oscillator only starts running, so to speak, upon depression of the pushbutton switch. The actuating signal B, however, may also be used for other triggering (releasing) purposes.

Assuming now that the pushbutton switch 32n is depressed. In that case, via the closed column switch 5n and the closed row switch 42, the supply voltage U will be fed to the input of the row inverter 72, and the output signal Z2 thereof will assume the L-level. In this way, the state at the output of the first NAND gate 90 is changed from the L-level to the H-level, so that the clock signal T is transformed into the two two-phase clock signals F, F̄. All of the switches which are controlled by the signal F (41, 4n, 52, 5m), are closed, and the switches (42, 4m, 51, 5n) which are controlled by the clock signal F̄, are opened. Via the row switch 52 and the column switch 4n, the supply voltage U is now applied to the column inverter 7n, so that the output signal Sn thereof will now assume the L-level. Thereupon, the previously undefined signal at the column output S1 will now assume, across the resistor 61, an H-level. Any further periods of the clock signal T will not change anything of the states in which the column and row outputs are in, because the column and the row inverters, as already mentioned, always remain in that particular state, via the hold inverters, which existed prior to the closing of the first column switch and of the second row switch.

Instead of the storage section formed of the respective row or column inverter with an antiparallel-connected hold inverter, it is also possible to use other storage cells; they are merely required to have the property of storing the previous state during one-half clock period of the clock signal T. Quite depending on the frequency of this clock signal, it might be sufficient, under certain circumstances, to employ a simple type of RC section.

Assuming now that at any arbitrary time position, the pushbutton switch 32n is released again. Relative thereto, two states are possible:

(a) first row switch 42 open, second row switch 52 closed, first column switch 4n closed, second column switch 5n open: Since the column output Sn assumes an H-level and the row output Z2 is likewise at a H-level, the end of depressing the pushbutton switch 32n is not recognized, and there is effected a further change in state of the signals F, F̄. Via the closed row switch 52, now also the row output signal Z2 will assume the H-state and the first NAND gate 90 will assume the L-level, thus signaling the end of the depression.

(b) row switch 42 closed, row switch 52 open, column switch 4n open, column switch 5n closed: The row output signal Z2 immediately assumes the H-state and will thus effect that simultaneously the actuating signal B will assume the L-state. In the course of this, the output signal Sn remains at the H-level. When considering that the end of actuation will in most cases block all functions, however, this H-state at the column output Sn is of no importance.

When redepressing any one of the pushbutton switches, the column signal Sn will remain at the H-level for the time of the first-half clock period of the clock signal T which, under certain circumstances, may lead to a double evaluation of this signal in a subsequently arranged evaluating circuit. Since such types of evaluating circuits, however, are anyway mostly provided with a fault-supervisory circuit which, in the case of many L-levels at the column outputs and in the case of more than one H-level at the column output or in the case of corresponding states at the row outputs, supplies a fault-indicating signal, the unwanted state will be recognized already during the first-half clock period and then eventually not utilized for this particular period of time. In this case, the fault criterion of the row outputs may also be used as an actuation identification in accordance with the actuating signal B, so that in this case the first NAND gate 90 may be omitted.

The current flowing in the inoperative state either across the column or the row resistors, can be completely suppressed in cases where these resistors are not connected to the zero point of the circuit directly, but via additional electronic switches, in which case the corresponding clock phase F, F̄ is to be used for controlling these switches. Thus, for example, the resistor 62 must be applied to the zero point of the circuit during the H-level of the clock signal F.

Figure 3:
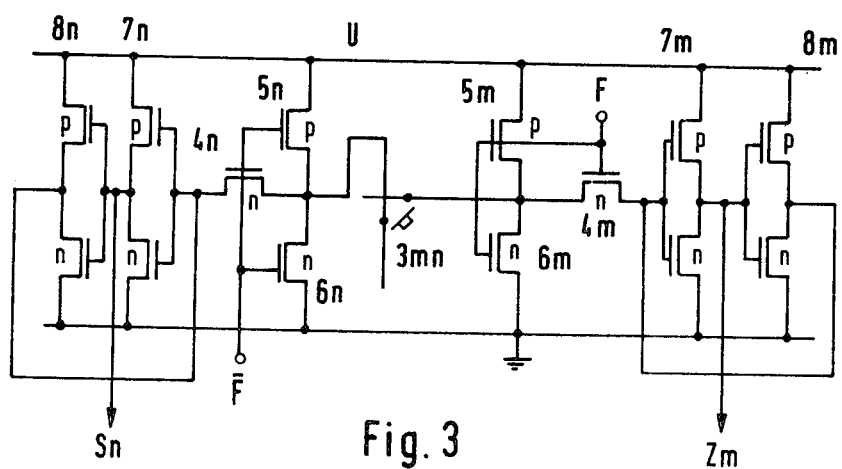
FIG. 3 shows a partial circuit diagram of the arrangement according to FIG. 1 realized in accordance with the known CMOS-technology.

In FIG. 3, with respect to the pushbutton switch 3mn and the crosspoint of the respective column and row leads of the matrix, it is shown how the circuit arrangement according to the invention can be realized in accordance with the known CMOS technology. The first column switch 4n and the second column switch 4m, as well as the resistors 6n, 6m are formed in this arrangement by N-channel transistors, while the second column switch 5n and the second row switch 5m are each formed by a P-channel transistor. The N-channel transistors 4m, 6m and the P-channel transistor 5m are applied to the signal F, hence to the output of the inverter 92 as shown in FIG. 1. In distinction thereto, the N-channel transistors 4n, 6n and the P-channel transistor 5n are applied to the clock signal F̄, hence to the output of the second NAND gate 91 as shown in FIG. 1. This mode of operation only formally appears to be in contradiction to the statements made in claim 1, and to FIG. 1, saying that the first column switch 4n must be lying at the clock signal F, and the first row switch 42 at the clock signal F̄. The fact that the N-channel transistor 4m in FIG. 3 may actually come to lie at the clock signal F̄, and the N-channel transistor 4n may come to lie at the clock signal F, is due to that these transistors are complementary to the transistors 5m, 5n, so that accordingly, also the opposite clock phase can be used for controlling them. Hence, there is in fact no contradiction with respect to the mode of operation.

The column inverters and row inverters 7n, 7m as well as the associated hold inverters 8n, 8m are conventional CMOS inverters which do not need to be explained in greater detail herein. The high-ohmic dimensioning of the hold inverters 8n, 8m is possible by correspondingly selecting the width-to-length ratio of the channel.

What is claimed is:

1. A circuit arrangement for an electronic equipment input keyboard comprising pushbutton switches arranged in n columns and m rows, having two terminals each, with each of said pushbutton switches, when actuated, connecting one column lead associated with the respective column, directly with one row lead associated with the respective row, and with the circuit arrangement transmitting with respect to the columns a one-out-of-n encoded signal and, with respect to the rows, a one-out-of-m encoded signal, said circuit arrangement comprising:
   a resistor associated with each of the column row leads, connecting said leads to circuit ground;
   a column inverter for each column lead;
   a first electronic column switch for each column lead for connecting the lead to an input of the column inverter;
   a second electronic column switch for each column lead for connecting the lead to a supply voltage;
   a row inverter for each row lead;
   a first electronic row switch for each row lead for connecting the lead to an input of the row inverter;
   a second electronic row switch for each row lead for connecting the lead to a supply voltage;
   a highly resistive hold inverter is connected in an antiparallel manner to each column inverter and to each row inverter respectively;
   a first NAND gate having m inputs connected to the outputs of the row inverters and an output;
   a second NAND gate having an input connected to the output of the first NAND gate and another input to which is applied at least temporarily a rectangular clock signal;
   an inverter has an input connected to the output of said second NAND gate;
   control inputs of both said first electronic column switches and said second electronic row switches are connected to the output of said inverter; and
   control inputs of both said first electronic row switches and said second electronic column switches are connected to the output of said second NAND gate.

2. A circuit arrangement as claimed in claim 1 realized in accordance with the CMOS technique, wherein
   each first electronic column switch, each first electronic row switch and each resistor is realized by an N-channel transistor;
   the gate terminals of the transistors of both said first and said second electronic row switches and of the resistor as associated with the respective row, are applied to the output of said inverter; and
   the terminals of the transistors of both said first and said second electronic column switches and of the resistor associated with the respective column, are applied to the output of said second NAND gate.

* * * * *